Oct. 6, 1959  C. T. HUTCHENS  2,907,576
HYDRO-PNEUMATIC EQUALIZING SUSPENSION FOR VEHICLES
Filed Oct. 21, 1955  4 Sheets-Sheet 1

INVENTOR
CHARLES T. HUTCHENS
BY Cushman, Darby & Cushman
ATTORNEYS

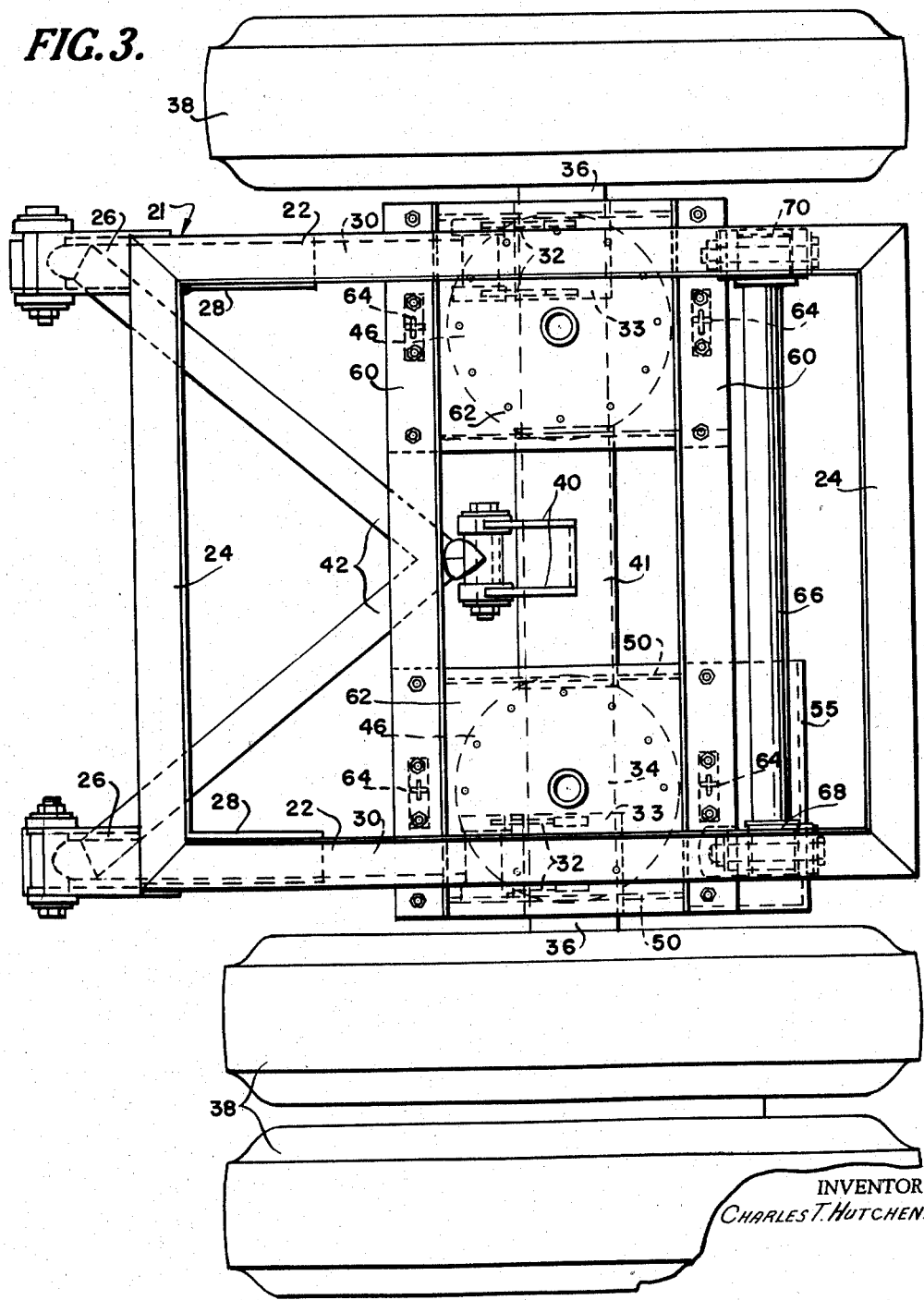

Oct. 6, 1959   C. T. HUTCHENS   2,907,576
HYDRO-PNEUMATIC EQUALIZING SUSPENSION FOR VEHICLES
Filed Oct. 21, 1955   4 Sheets-Sheet 3
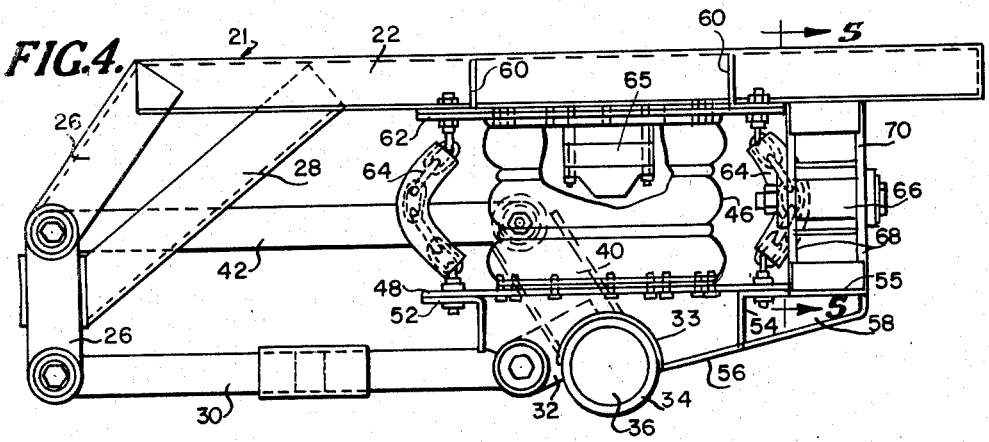
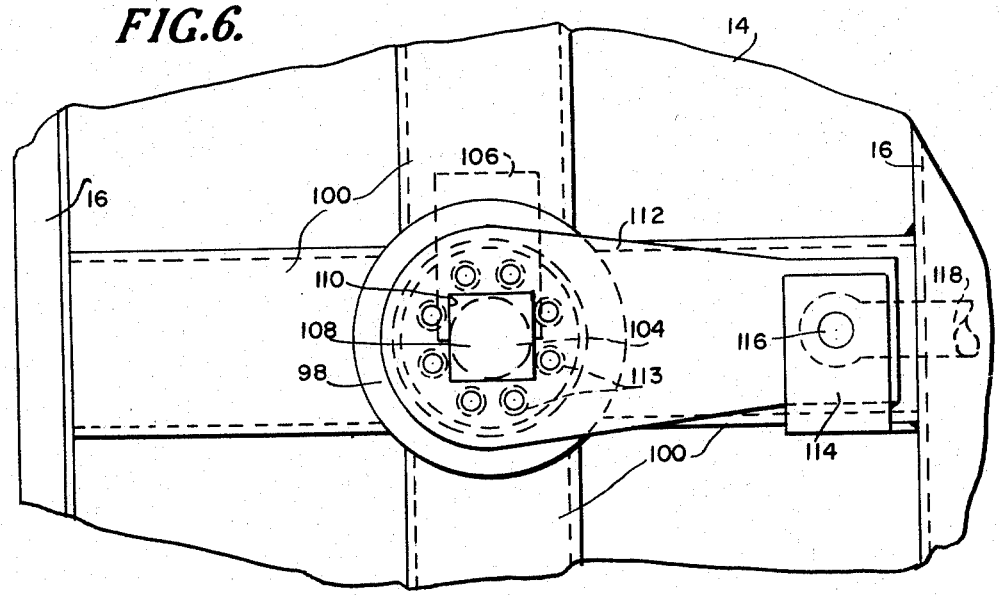
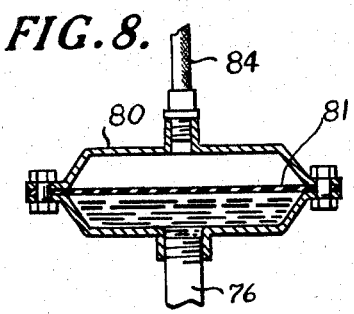
INVENTOR
CHARLES T. HUTCHENS
BY Cushman, Darby & Cushman
ATTORNEYS Oct. 6, 1959

C. T. HUTCHENS 2,907,576

HYDRO-PNEUMATIC EQUALIZING SUSPENSION FOR VEHICLES

Filed Oct. 21, 1955

INVENTOR
CHARLES T. HUTCHENS

BY Cushman, Darby & Cushman
ATTORNEYS

United States Patent Office 2,907,576
Patented Oct. 6, 1959

2,907,576

HYDRO-PNEUMATIC EQUALIZING SUSPENSION FOR VEHICLES

Charles T. Hutchens, Springfield, Mo.

Application October 21, 1955, Serial No. 541,951

2 Claims. (Cl. 280—104)

This invention relates to vehicles and more particularly to a semi-trailer construction.

In the conventional semi-trailer truck, the load on the trailer platform is carried at two points on the trailer; namely, the fifth wheel connection with the tractor and the rear axle thereof. Even if tandem axles are utilized, the weight is effectively carried at the front and rear only of the trailer. Consequently, in loading such trailer it often happens that the weight of the load is unequally distributed and when the trailer is checked at a weighing station, it is necessary to redistribute the load before the truck can pass inspection. Obviously, this gives rise to bothersome procedures which cut down on the efficiency of the run, both with respect to time and money.

Accordingly, it is an object of the present invention to provide a semi-trailer construction having load-bearing means spaced throughout the longitudinal extent thereof so as to substantially overcome the weight distribution problem noted above.

A further object of the present invention is the provision of a semi-trailer of the type described which includes a novel means for equalizing the load carried between the centrally disposed axle and the rear axle so as to alleviate undue stress on the trailer body caused by the conditions noted above.

A still further object of the present invention is the provision of a novel suspension means for the load-bearing axle of a vehicle which insures level travel and prevents undue lateral sway of the vehicle body.

Still another object of the present invention is the provision of a novel semi-trailer axle suspension means which is operable to maintain the trailer body in an even condition notwithstanding vertical undulations in the road.

In conjunction with the axle load-equalizing means provided by the present invention, it has been found possible to provide gauges which will indicate the amount of load carried by each axle. It will be understood that such a gauge would be quite advantageous, not only in distributing the weight of the load as it is placed on the trailer platform, but in determining the final amount carried by each axle so as to indicate that local inspection laws will be adhered to.

Accordingly, it is still another object of the present invention to provide a novel means for indicating the amount of load carried by each load-bearing axle of a semi-trailer.

These and other objects of the present invention will become more apparent during the course of the following detailed description and appended claims.

The invention may best be understood with reference to the accompanying drawings wherein an illustrative embodiment is shown.

In the drawings:

Figure 3 is a top plan view of one of the axle assemblies;

Figure 4 is a side elevational view of the axle assembly;

Figure 6 is a fragmentary top plan view illustrating the king pin of the trailer which connects to the tractor fifth wheel;

Figure 8 is an enlarged cross sectional view taken along the line 8—8 of Figure 2.

Figure 1:
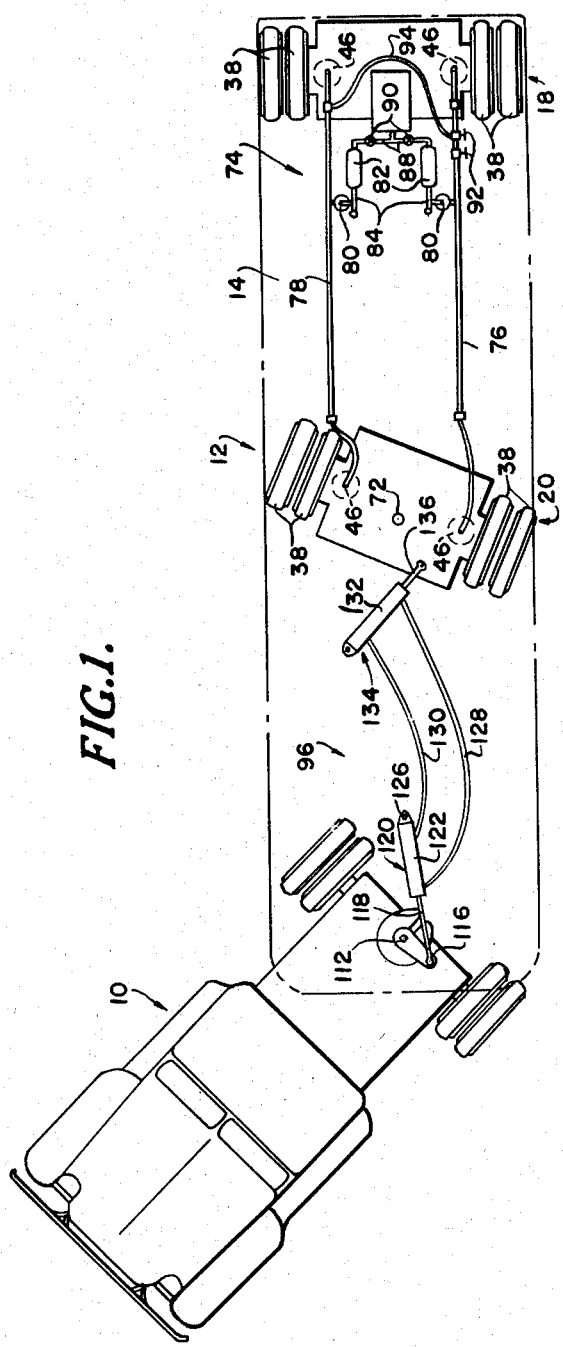
Figure 1 is a top plan view of a tractor-trailer unit or semi-trailer truck vehicle embodying the principles of the present invention and illustrating the manner in which the centrally disposed axle assembly is steered in response to the horizontal angular movement of the tractor with respect to the trailer.
Figure 2:
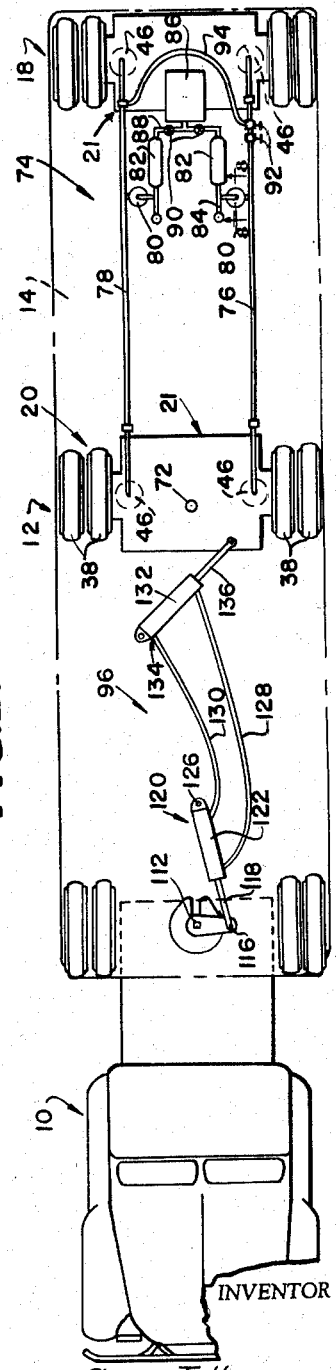
Figure 2 is a view similar to Figure 1 illustrating the position of the parts when the tractor is in alignment with the trailer.

Referring now more particularly to the drawings, there is shown in Figures 1 and 2 a semi-trailer truck or tractor trailer unit which includes a conventional tractor, generally indicated at 10, and a trailer, generally indicated at 12. It will be understood that the tractor 10 may be of conventional construction and forms no part of the present invention except insofar as it is combined with the trailer 12 to form an operable unit.

Figure 7:
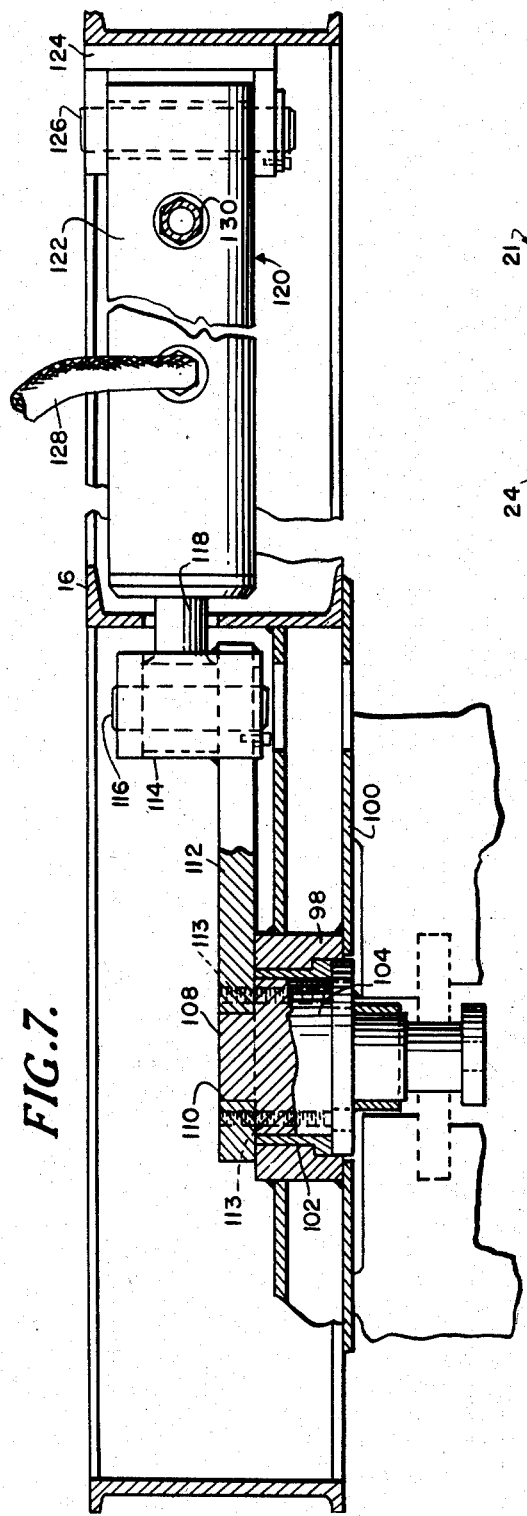
Figure 7 is a vertical sectional view through the king pin.

The trailer 12 includes a body of conventional construction having a load-bearing platform, generally indicated at 14. This platform may be constructed in the conventional manner to include the usual structural beams, and the like, which are customarily utilized to form such platforms. Figure 7 illustrates certain of these beams, which are indicated at 16.

Mounted beneath the load-bearing platform 14 is a pair of axle assemblies, generally indicated at 18 and 20, the axle assembly 18 being disposed underneath the rear end of the platform and the axle assembly 20 being disposed underneath the central portion of the platform. Each of the axle assemblies is identical in construction, except as otherwise noted hereinafter, so that a description of one should suffice to give a clear understanding of both.

Figure 5:
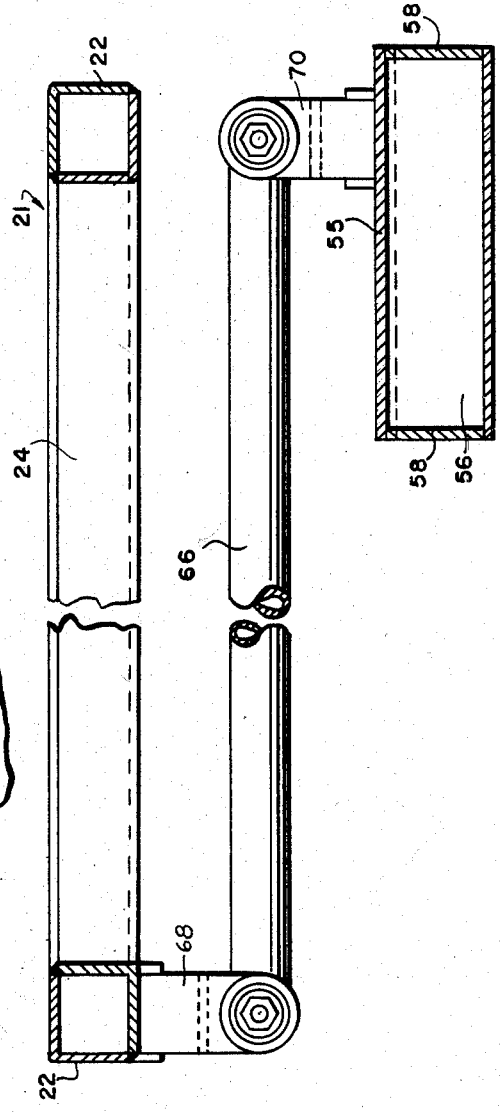
Figure 5 is a cross sectional view taken along the line 5—5 of Figure 4.

As best shown in Figures 3–5, each axle assembly comprises a horizontal subframe 21 which may be constructed of a pair of transversely spaced, longitudinal tubular frame members 22, of angle iron construction or the like, and a pair of transverse, tubular frame members 24, of angle iron construction or the like, having their ends rigidly secured to the ends of the frame members 22, as by welding or the like. Extending downwardly and forwardly from the forward end of the subframe at each side thereof is an angular bracket 26, which preferably is of channel beam construction or the like, having its upper end rigidly secured to the forward end of the associated longitudinal frame member 22 by any suitable means, such as welding or the like. Preferably, a strap or brace 28, which may be of angle iron construction or the like, is rigidly secured between the lower end portion of each bracket 26 and the associated frame member 22 at a point spaced rearwardly from the forward end thereof. Each brace 28 is rigidly secured in position by any suitable means, such as welding or the like.

Extending rearwardly from each bracket 26 is a link 30, preferably a tubular construction, having its forward end pivotally secured to the lower end of the bracket. The rear end of each link 30 is pivotally attached to a bracket 32, preferably made of transversely spaced plates, rigidly mounted on a saddle plate 33 secured to an axle housing 34. The axle housing 34 is arranged to carry a suitable axle 36 upon the ends of which are mounted suitable wheels 38 in a manner well known in the art.

A bracket 40, similar to bracket 32, is rigidly secured to central saddle plate 41 anchored to the central portion of the axle housing and extends upwardly and forwardly therefrom. The free end of the bracket 40 pivotally receives the apex of a V-shaped or wish-bone link 42, preferably of tubular construction. The ends of the legs of the V-shaped link 42 are pivotally connected to the respective brackets 26 in vertically spaced relation to the pivots of the links 30 therewith. As best shown in Figure 4, it can be seen that the parallel links 30 and V-shaped link 42 constitute a parallel linkage mounting for the axle housing which permits the latter to move vertically with substantially pure translatory motion.

This vertical movement of the axle housing is yieldably resisted by a load-bearing means, which may take many forms but, as shown, preferably comprises a pair of flexible, fluid-containing bellows 46, which may be constructed in any well-known manner. The lower end of each bellows 46 is connected to one side of the axle housing through a horizontal plate 48 rigidly secured thereto. Extending downwardly from each plate 48 is a pair of transversely spaced vertical plates 50, rigidly secured at their upper ends to the underside of the associated plate 48 and having their lower edges rigidly secured to the upper surface of the saddle plates 33 and 41, respectively. To obtain additional strength, a transversely extending forward angle iron 52 may have its horizontal flange secured beneath the forward end of each plate 48 and its vertical flange secured to the forward ends of the vertical plates 50. Moreover, a rearward angle iron 54 may be secured between the rear end of each plate 48 and associated plates 50 in a like manner.

Adjacent the rear end of one of the plates 48, a plate 55 is mounted for purpose hereinafter to be more fully described. To securely anchor this plate in position, an angular plate 56 is rigidly attached at its rear end to the rear end of the plate 55 and extends downwardly and forwardly therefrom so that its forward end portion may be rigidly secured to the lower edges of the vertical plates 50 extending rearwardly of the axle housing. Additional end plates 58 may be secured, as by welding and the like, between the lateral ends of angle iron 54, plate 55 and angular plate 56. It will be understood that while the above described construction is preferred, other arrangements may be utilized, if desired.

The upper end of each bellows 46 is rigidly secured beneath the subframe by means of a pair of spaced transverse frame members 60 rigidly secured at their ends to the longitudinal frame members 22 and extending across the entire subframe. Mounted beneath each end of the frame members 60 is a horizontal plate 62 which fixedly receives the upper end of the associated bellows. If desired, chains 64 may be secured between plates 48 and 62 to limit relative movement away from each other while shock bumpers 65 may be provided to limit relative movement toward each other.

In order to positively prevent lateral displacement between the axle housing 34 and subframe 21, a horizontally disposed sway bar 66, of tubular construction, is connected between the axle housing and subframe. As best shown in Figure 5, a bracket 68, preferably made up of a pair of spaced plates, is rigidly secured to and extends down from one side of the subframe. Between the lower end of the plates, one end of the sway bar 66 is pivotally attached and the opposite end thereof is pivotally attached to a similar bracket 70, which is rigidly secured to and extends upwardly from the plate 55.

The axle assembly 18, constructed in the manner indicated above, is rigidly secured beneath the rear end of the platform 14 by any suitable means, such as welding or the like. Thus, the axle housing of the assembly 18 may have yieldingly restricted vertical movement, but the same is fixed so that no angular movement in a horizontal plane is possible. The forward axle assembly 20, which is also constructed in the manner indicated above, is mounted beneath the central portion of the platform for rotation about a vertical axis so as to enable the same to be steered in accordance with the horizontal angular movement of the tractor with respect to the trailer. It will be understood that any suitable means may be used to accomplish this movement as, for example, a pivot pin or shaft 72 rigidly secured to the central portion of the subframe 21 and journaled within a suitable bearing in the platform. As best shown in Figures 1 and 2, it is preferred that the pivotal axis of the forward axle assembly be spaced forwardly of the rotary axis of the wheels so that there will be a certain castering effect which greatly aids in steering. It will be understood that the pivot pin 72 may be rigidly secured to the platform and journaled within the subframe, if desired.

In order to balance the load carried by each axle assembly and to prevent undue stress on the vehicle body due to unevenness in the road, a load-equalizing system, generally indicated at 74, is provided which utilizes the bellows of each axle assembly. As best shown in Figures 1 and 2, the bellows on the left hand side of the axle assemblies 18 and 20 are directly connected together by any suitable means, such as conduit 76. In like manner, the bellows on the right hand side of the axle assemblies are directly interconnected by a second conduit 78. It is preferred that the interconnected bellows on each side of the trailer be filled with a suitable liquid, such as oil, water or the like, so that there will be substantially instantaneous response in one axle assembly to a variation in the pressure of the other. However, in order to cushion the effect of the non-compressible fluid utilized within the bellows, there is directly interconnected with each conduit 76 and 78 a pressure chamber 80 of conventional construction having a flexible diaphragm 81 therein (see Figure 8). Each pressure chamber is connected to its respective conduit so that one side of the flexible diaphragm communicates with the conduit and, hence, is adapted to contain the liquid therein. The opposite side of the diaphragm preferably contains a compressible fluid, such as air or the like, and is directly connected with a surge tank 82, as by conduit 84 or the like. It can be seen that if the fluid pressure within the bellows on either side of the trailer increases, this increase in pressure will be transmitted to the flexible diaphragm and due to the compressible fluid contained in the opposite side thereof, deflection of the diaphragm will be yieldingly resisted. Thus, the surge tanks act to limit the amount the diaphragms can expand, which in turn limits the amount of relative vertical movement that an increase in pressure can cause. Stated differently, when the wheels of the trailer pass over a bump or the like, the shock of the bump is taken by the diaphragm which expands and transmits the shock to the air surge tank. This action effectively cushions all shocks encountered and insures an even travel of the platform.

If desired, each air surge tank 82 may be suitably connected with the usual air brake tank 86 of the trailer, as by a conduit 88. Of course, suitable valves 90 should be provided for closing off communication between the air brake tank and the surge tank when the latter is in use.

A further feature made possible with the utilization of the present load-equalizing system, is the provision of a gauge means for indicating the load carried by the axle assemblies. Preferably, such means may simply take the form of a pair of conventional pressure-responsive gauges 92 separately connected with respective conduits 76 and 78 by any suitable means, such as conduits 94. The gauges 92 may be located in any desirable position and, as shown, they are disposed just forwardly of the rear axle assembly beneath the platform of the trailer. It can be seen that since the bellows directly transmit the load of the platform to the axle housings, the fluid pressure contained within the bellows will be a function of the load on the platform. Thus, it is a mere matter of calibrating the dial of the fluid pressure gauges to obtain an indication of the load carried by the axles.

As was indicated above, the forward axle assembly 20 is mounted for pivotal movement about the vertical shaft 72 so that the latter may be steered in accordance with the horizontal angular movement of the tractor with respect to the trailer. In order to effect this movement, there is provided a steering means, generally indicated at 96. As best shown in Figures 6 and 7, the forward end of the platform 14 is provided with a vertically extending bearing 98 which is rigidly secured to the adjacent beams 16 of the platform by means of suitable structural frame members, indicated at 100. These frame members may be rigidly secured to the beams 16 and to the bearing 98, as by welding or the like, sufficiently to firmly anchor the bearing in position. Rotatably mounted within the bearing 98, as by a bearing sleeve 102, is a king pin 104. The king pin extends downwardly from the bearing 98 and has its lower end arranged to engage within the fifth wheel of the tractor in the usual manner. In addition, a dog or lug 106 is rigidly secured to the lower end of the king pin and extends radially outwardly therefrom so as to fit within the king pin slot of the tractor fifth wheel. In this manner, the king pin 102 is fixedly received within the tractor fifth wheel or, at least, is connected therewith so as to move with the tractor angularly.

The upper end of the king pin 104 terminates in a square projection 108 which is received within a correspondingly shaped aperture 110 formed in one end of a radially extending arm 112. Arm 112 may be rigidly secured to the king pin by any suitable means such as bolts 113. Rigidly secured to the opposite end of arm 112 is an L-shaped bracket 114 having its horizontal leg disposed in parallel relation to the outer end of the arm 112. Pivotally secured between the horizontal leg of the bracket 114 and the outer end of the arm 112, as by pivot pin 116, is one end of a piston rod 118 forming a part of a fluid-operated ram unit, generally indicated at 120. The ram 120 further includes the usual piston (not shown) attached to the opposite end of the piston rod 118 which reciprocates within a conventional cylinder 122. The rear end of the cylinder 122 is pivotally mounted on the trailer platform by means of a U-shaped bracket 124 having a pivot pin 126 extending through the legs thereof and the end of the cylinder. Preferably, the ram 120 is double acting and includes conduits 128 and 130 connected to opposite ends thereof, which conduits are also connected in a like manner to the opposite ends of a cylinder 132 of a second ram unit, generally indicated at 134. The forward end of the cylinder 132 may be suitably pivoted to the platform, in a manner similar to the cylinder 122, and the ram further includes the usual piston (not shown) having a piston rod 136 extending therefrom. The outer end of the piston rod 136 is pivotally mounted to the subframe 21 of the forward axle assembly 20, at a position spaced radially from the pivot pin 72. It will be seen that since king pin 104 is fixed with respect to the tractor to move angularly therewith, horizontal angular movement of the tractor with respect to the trailer will cause a corresponding angular movement of the arm 112 with respect to the platform. This angular movement will result in an extension or retraction of the first ram 120 and because the latter is directly connected to the second ram 134, the latter will be extended or retracted a corresponding amount. Extension and retraction of the second ram 134 will cause the axle assembly 20 to pivot about pivot pin 72.

In operation, it will be seen that the suspension of each axle housing is such that yieldingly restricted vertical translational movement is permitted while torsional movement and lateral displacement are effectively prevented. Thus, the parallel links 30 and wish-bone link 42 serve to mount the axle housing for vertical translational movement, and, in addition, prevent torsional movement thereof which may occur during braking and the like. Furthermore, the wish-bone link 42 provides a certain amount of lateral stability to the mounting, which lateral stability is completely insured by the provision of the horizontal sway bar 66. If desired, the pivotal connections of the sway bar and links may be resiliently journaled so as to substantially take up any lateral play that might occur, due to the connection of the sway bar, as the axle housing moves vertically with respect to the trailer platform. As stated above, the bellows 46 distribute the load from the platform to the axle housing and because the bellows do not afford any lateral stability, the mounting described above is preferred.

It can thus be seen that with the axle housing suspension utilized in the present axle assemblies, the assemblies may readily be located beneath the platform in the positions shown in the drawings, rather than both at the rear end as is customary. As was previously indicated, by disposing the forward axle assembly beneath the central portion of the trailer body, the load can be supported by the trailer more readily than is the case where only rear axles are provided. It is contemplated that the forward axle assembly may be so located as to support the trailer without the connection to the tractor fifth wheel. Of course, when the latter connection is made, a certain amount of the load will be assumed thereby, but this amount will be considerably less than would be the case if no centrally disposed axle were provided.

With the provision of a centrally disposed axle, turning is quite difficult in that considerable lateral movement of the central axle housing will occur. This lateral movement results in excessive wear to the tires and it has been found that unless some means is provided for making the central axle assembly track as the trailer is turned, this wear can be quite considerable. With the present invention a positive steering of the central axle assembly is accomplished by means of the steering system 134 in the manner indicated above. It will be understood that by appropriately varying the relative size of the ram units or by changing the effective lever arms through which the rams operate, varying portions of the movement of the tractor can be transmitted to the central axle assembly. As shown in Figure 1, it can be seen that angular movement of the tractor with respect to the trailer is somewhat greater than the angular movement of the axle assembly with respect to the trailer. This condition is desirable in that the portion of the trailer adjacent the central axle assembly does not swing or turn in as narrow an arc as does the trailer. Moreover, by spacing the vertical pivot or steering axis of the central axle assembly forwardly of the axis of rotation of the wheels, steering is made easier in that the pull on the trailer aids in turning, on the same principle as a castering wheel.

Another problem effectively solved by the present invention which arises as a result of mounting the forward axle assembly beneath the central portion of the trailer in that unevenness in the road can cause undue stress on the tractor body. For example, assuming that the trailer is being pulled over the crest of a hill, it will be seen that without equalized suspensions the central axle assembly would assume a large portion of the load while the fifth wheel and rear axle assembly would assume a rather minor portion of the load. Conversely, in passing through the bottom of a valley the fifth wheel and rear axle would assume the major load and the central axle would assume very little. This shifting of the load assumed by the various load bearing structures would soon cause undue stress in the body in addition to the excessive wear which would result in the fifth wheel and axle assemblies. With the present invention, the load carried by the forward axle assembly will at all times be equal to the load carried by the rear axle assembly. In the situations mentioned above, first, when the trailer is passing over the top of a hill, the bellows of the central axle assembly will be compressed due to the increased load thereon and the depression of the bellows will be transmitted to the bellows of the rear axle assembly, thus extending the same. Likewise in passing a dip or valley in the road, the pressure on the rear axle assembly will be increased and the bellows depressed, but such increase in pressure and depression will be directly transmitted to the forward axle assembly to extend the same. In this manner, not only is undue stress eliminated, but even travel of the platform is insured. Furthermore, the present load-equalizing system provides an efficient means for cushioning shocks that might occur when the wheels run over an object or enter a depression. In this case, the rapid increase or decrease of the pressure within the associated bellows will result in deflection of the diaphragm of the pressure chamber. Since the deflection of the diaphragm is yieldably resisted by the air contained within the surge tank, such shocks are effectively cushioned and the trailer is kept on a near even keel. This latter condition is true in going around a curve, a condition which is virtually impossible to accomplish with conventional leaf-spring suspension systems. Finally, the present load-equalizing system enables the simple provision of gauge means for indicating the load carried by the axle assembly at all times with the obvious advantage attendant thereto.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In a vehicle suspension, a vehicle frame, forward and rearward axle assemblies secured to said frame, each of said axle assemblies comprising a subframe secured to said vehicle frame, said subframe including a pair of transversely spaced brackets rigidly secured in depending relation to the forward end thereof, a pair of transversely spaced links connected at their forward ends to said brackets for pivotal movement about a first transverse axis, an axle housing having the rear ends of said links connected to opposite sides thereof for pivotal movement about a second transverse axis, a V-shaped link having the ends of its legs connected to said brackets for pivotal movement about a transverse axis spaced vertically from said first transverse axis and its apex connected to the mid-portion of said axle housing for pivotal movement about an axis spaced vertically from said second transverse axis, and a plurality of yieldable load-carrying devices operatively connected between said frame and said axle housing, said yieldable load-carrying devices comprising hydraulic bellows, conduit means directly interconnecting the hydraulic bellows on each side of said axle housings independently so as to maintain the hydraulic pressures therein substantially equal, a pressure chamber for the bellows on each side of said axle housings, each of said pressure chambers including a flexible diaphragm having one side thereof connected to said conduit means, and a gas containing surge tank connected to the other side of each diaphragm.

2. In a vehicle suspension, a vehicle frame, a rear axle housing mounted on the rear end of said frame for vertical movement with respect thereto, a forward axle housing mounted on said frame forwardly of said rear axle housing for vertical movement with respect thereto, load-bearing hydraulic bellows operatively connected between opposite sides of each of said axle housings and said frame, conduit means directly interconnecting the hydraulic bellows on each side of said axle housings independently so as to maintain the hydraulic pressures therein substantially equal, a pressure chamber for the bellows on each side of said axle housings, each of said pressure chambers including a flexible diaphragm having one side thereof connected to said conduit means and a gas containing surge tank connected to the other side of each diaphragm.

References Cited in the file of this patent

UNITED STATES PATENTS

| | | |
|---|---|---|
| 1,667,275 | Warhus | Apr. 24, 1928 |
| 2,078,521 | Alden | Apr. 27, 1937 |
| 2,105,553 | Schroter | Jan. 18, 1938 |
| 2,300,844 | Olley | Nov. 3, 1942 |
| 2,359,978 | Edwards | Oct. 10, 1944 |
| 2,367,817 | Brown | Jan. 23, 1945 |
| 2,433,269 | Fellabaum | Dec. 23, 1947 |
| 2,452,105 | Consentino | Oct. 26, 1948 |
| 2,638,358 | Larison | May 12, 1953 |
| 2,707,110 | Stover | Apr. 26, 1955 |
| 2,713,498 | Brown | July 19, 1955 |
| 2,717,787 | Ward | Sept. 13, 1955 |
| 2,785,909 | Barnard | Mar. 19, 1957 |
| 2,801,865 | Katzung | Aug. 16, 1957 |
| 2,812,954 | Lyon | Nov. 12, 1957 |